(12) United States Patent
Lee

(10) Patent No.: US 8,335,352 B2
(45) Date of Patent: Dec. 18, 2012

(54) METHOD AND APPARATUS FOR DETECTING LANE

(75) Inventor: Yun-hee Lee, Hwaseong (KR)

(73) Assignee: Mando Corporation, Pyeongtaek (KR)

( * ) Notice: Subject to any disclaimer, the term of this patent is extended or adjusted under 35 U.S.C. 154(b) by 362 days.

(21) Appl. No.: 12/581,375

(22) Filed: Oct. 19, 2009

(65) Prior Publication Data
US 2010/0098294 A1 Apr. 22, 2010

(30) Foreign Application Priority Data
Oct. 22, 2008 (KR) ........................ 10-2008-0103385

(51) Int. Cl.
*G06K 9/00* (2006.01)
(52) U.S. Cl. ...................................... 382/104
(58) Field of Classification Search .................. 382/103, 382/104; 348/118
See application file for complete search history.

(56) References Cited

U.S. PATENT DOCUMENTS
2002/0080998 A1* 6/2002 Matsukawa et al. .......... 382/103
2010/0079590 A1* 4/2010 Kuehnle et al. ............... 348/118

\* cited by examiner

*Primary Examiner* — Claire X Wang
(74) *Attorney, Agent, or Firm* — McDermott Will & Emery LLP

(57) ABSTRACT

A method and an apparatus for detecting a lane are disclosed. The lane detecting apparatus includes: a region of ID setup setting a region of ID including a road region of a current lane in an acquired image; a road sign verifier verifying existence of a road sign within the set region of ID; an ROI setup calculating a difference value between a lane prediction result and previous lane information when there exists a road sign and setting an ROI based on the calculated difference value; and a lane detector detecting a lane by extracting lane markings based on the set ROI. Accordingly, a lane can be more accurately detected even in a road environment including a road sign by removing the road sign to extract only necessary lane markings.

6 Claims, 7 Drawing Sheets

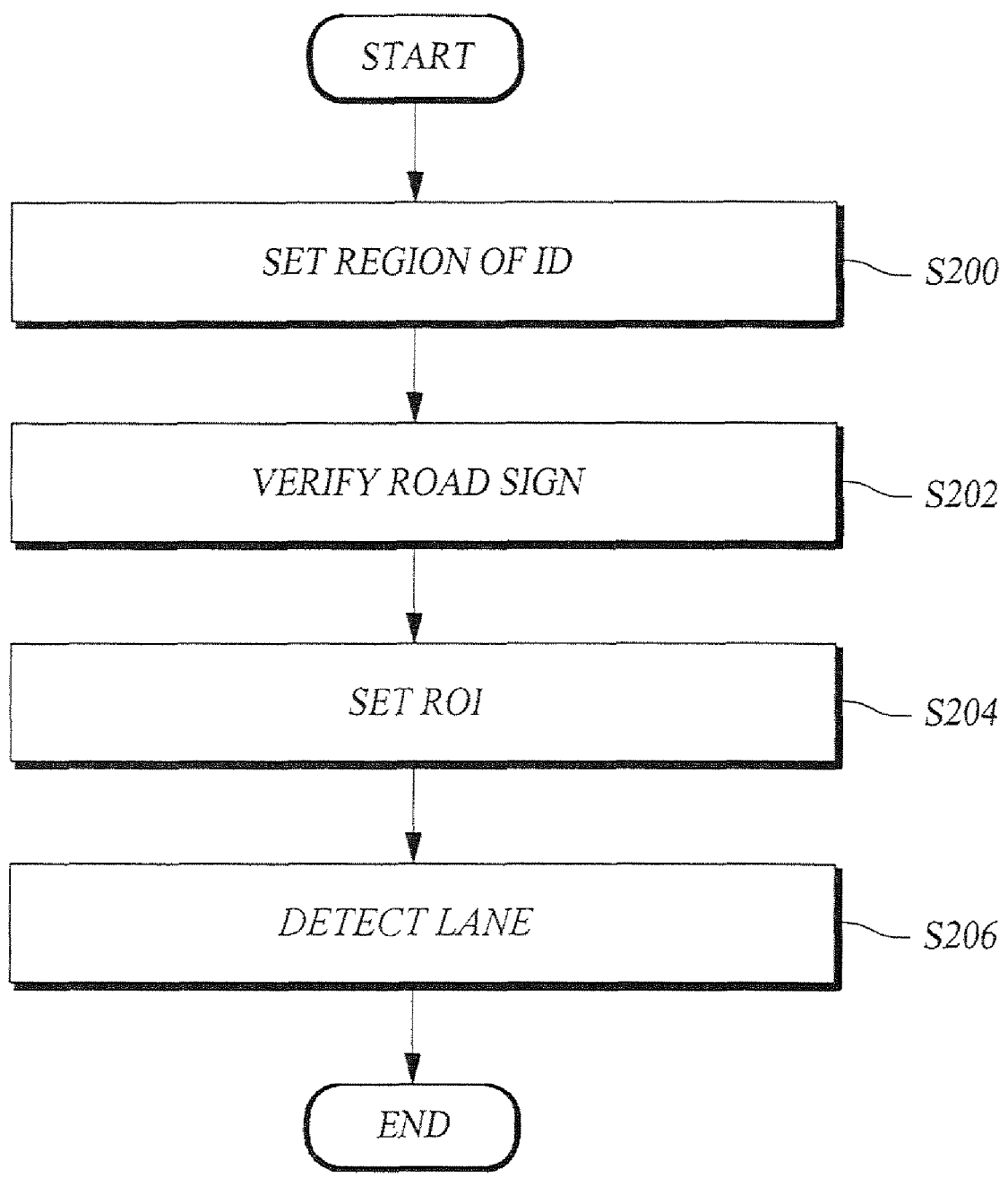

REGION OF ID

METHOD AND APPARATUS FOR DETECTING LANE

CROSS-REFERENCE TO RELATED APPLICATIONS

This patent application claims the benefit and priority of Korean Patent Application No. 10-2008-0103385 filed Oct. 22, 2008. The entire disclosure of the above application is incorporated herein by reference.

BACKGROUND OF THE INVENTION

1. Field of the Invention

The present invention relates to a method and an apparatus for detecting a lane, and more particularly to a method and an apparatus for detecting a lane that enable more accurate detection of lane by extracting the lane even in a road environment including a road sign, considering the road sign.

2. Description of the Prior Art

In an existing lane detecting method, detection of a lane is achieved by extracting lane markings. Meanwhile, more accurate detection of a lane is enabled by removing factors that cause errors in detection of a lane like surrounding noise such as blocking of the lane by a preceding vehicle during extraction of lane markings in order to extract the lane markings.

There are road signs such as right turn, left turn, and other directional signs on roads in addition to lane markings. Since such road signs are displayed on roads like land markings and include the same color information as that of the lane markings, they may become factors that cause errors in the process of extracting lane markings.

However, in the existing lane detecting method, since lane markings are extracted without considering road signs, an error may be caused in extracting lane markings in a road environment including a road sign, hampering accurate detection of a lane.

SUMMARY OF THE INVENTION

Accordingly, the present invention has been made to solve the above-mentioned problems occurring in the prior art, and an object of the present invention is to provide a method and an apparatus for detecting a lane that enable more accurate detection of a lane by extracting the lane even in a road environment including a road sign, considering the road sign.

In order to accomplish this object, there is provided a lane detecting apparatus including: a region of ID setup setting a region of ID including a road region of a current lane in an acquired image; a road sign verifier verifying existence of a road sign within the set region of ID; an ROI setup calculating a difference value between a lane prediction result and previous lane information when there exists a road sign and setting an ROI based on the calculated difference value; and a lane detector detecting a lane by extracting lane markings based on the set ROI.

In accordance with another aspect of the present invention, there is provided a lane detecting method including the steps of: (a) setting a region of ID including a road region of a current lane in an acquired image; (b) verifying existence of a road sign within the set region of ID; (c) calculating a difference value between a lane prediction result and previous lane information when there exists a road sign and setting an ROI based on the calculated difference value; and (d) detecting a lane by extracting lane markings based on the set ROI, wherein the set ROI is an ROI from which the road sign that has existed within the region of ID is removed by calculating the difference value between the lane prediction result and the previous lane information to set the ROI thereby.

As described above, a lane can be detected more accurately even in a road environment including a road sign by removing the road sign to extract only lane markings.

BRIEF DESCRIPTION OF THE DRAWINGS

The above and other objects, features and advantages of the present invention will be more apparent from the following detailed description taken in conjunction with the accompanying drawings, in which:

FIG. 2 is a schematic flowchart of a lane detecting method according to an embodiment of the present invention;

DETAILED DESCRIPTION OF THE PREFERRED EMBODIMENTS

Figure 1:
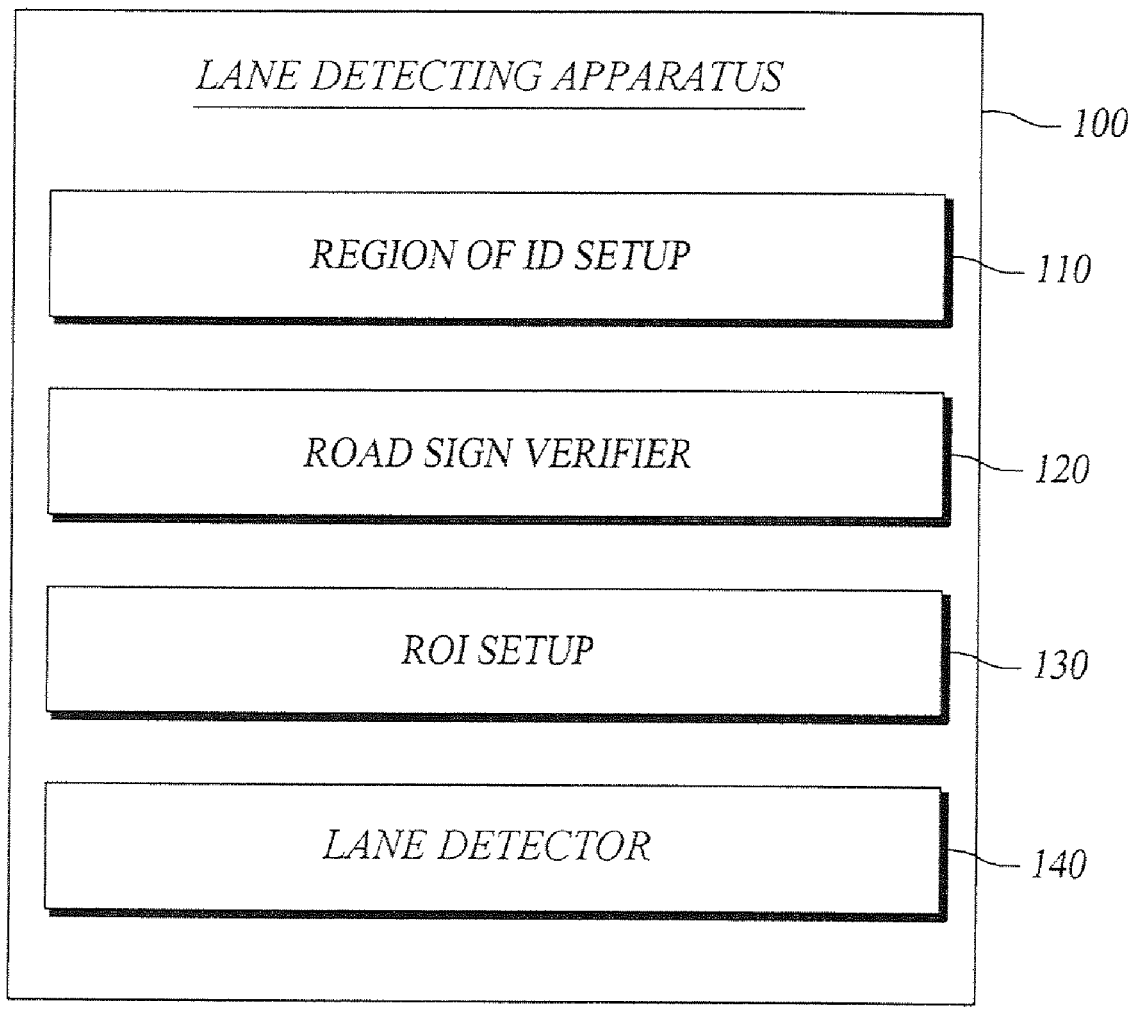
FIG. 1 is a schematic block diagram of a lane detecting apparatus according to an embodiment of the present invention.

Hereinafter, a preferred embodiment of the present invention will be described with reference to the accompanying drawings. It is apparent that the same reference numerals are used designate the same or similar components in adding them to the elements of the drawings even when they are displayed in different drawings. Moreover, in the description of the present invention, well-known configurations and functions are not set forth in detail in order to avoid obscuring the scope of the invention.

In the description of the elements of the present invention, the terms 'first', 'second', 'A', 'B', '(a)', and '(b)' may be used. However, since the terms are used only to distinguish an element from another, the essence, sequence, and order of the elements are not limited by them. When it is described that an element is "coupled to", "engaged with", or "connected to" another element, it should be understood that the element may be directly coupled or connected to the other element but still another element may be "coupled to", "engaged with", or "connected to" the other element between them.

FIG. 1 is a schematic block diagram of a lane detecting apparatus 100 according to an embodiment of the present invention.

The lane detecting apparatus 100 according to the embodiment of the present invention illustrated in FIG. 1 accurately extracts lane markings by removing a road sign that may be a factor causing an error in accurately extracting the lane markings in the process of extracting the lane markings to detect a lane, thereby enabling correct detection of the lane.

As illustrated in FIG. 1, the lane detecting apparatus 100 according to the embodiment of the present invention includes: a region of ID setup 110 setting a region of ID for identifying existence of a road sign that will be removed to correctly detect a lane in detecting the lane using an image acquired by a camera; a road sign verifier 120 verifying the existence of the road sign in the set region of ID; an ROI setup 130 setting a region of interest (ROI) from which the road sign that has existed is removed; and a lane detector 140 detecting the lane based on the set ROI.

The region of ID setup 110 sets a region of ID including a road region of the current lane in the acquired image. The road sign verifier 120 verifies existence of a road sign within the region of ID set by the region of ID setup 110. When a road sign exists in the region of ID after the verification by the road sign verifier, the ROI setup 130 calculates a difference value between a lane prediction result and previous lane information and sets an ROI based on the calculated difference value. The lane detector 140 extracts lane markings to detect a lane by using lane tracking based on the ROI set by the ROI setup 130. Here, a prediction filter such as a Kalman filter may be used for the lane tracking.

A lane that is a target to be detected by the lane detecting apparatus 100 according to the embodiment of the present invention, lane markings extracted for detection of the lane, and a road sign that is a target to be removed as an obstacle factor during detection of the lane will be described using an example illustrated in FIGS. 3A and 3B.

Figure 3A:
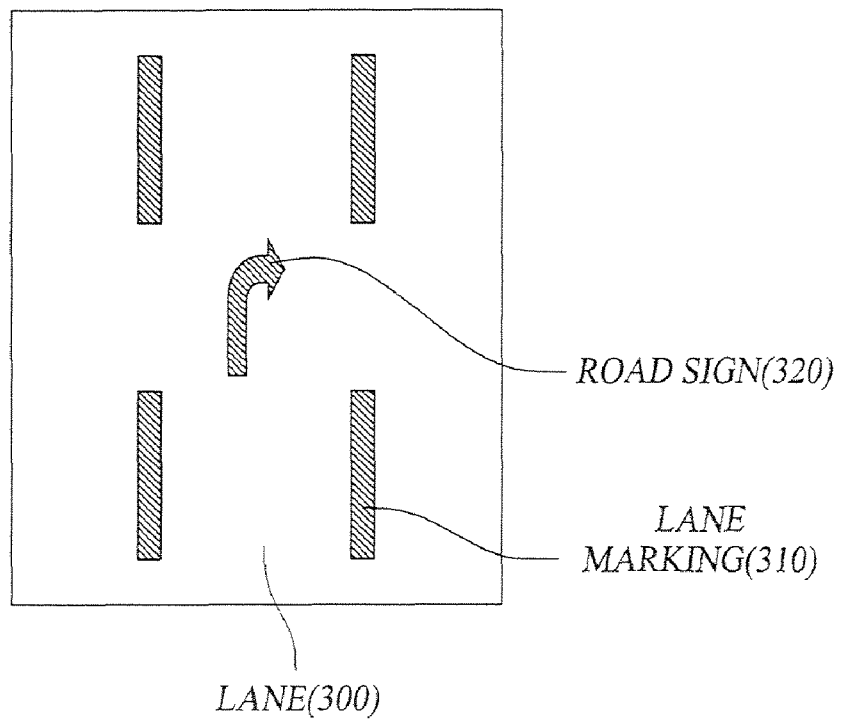
FIGS. 3A and 3B are views illustrating examples of a road sign that will be removed as an obstacle element during detection of a lane that will be detected and lane markings extracted for the detection of the lane.
Figure 3B:
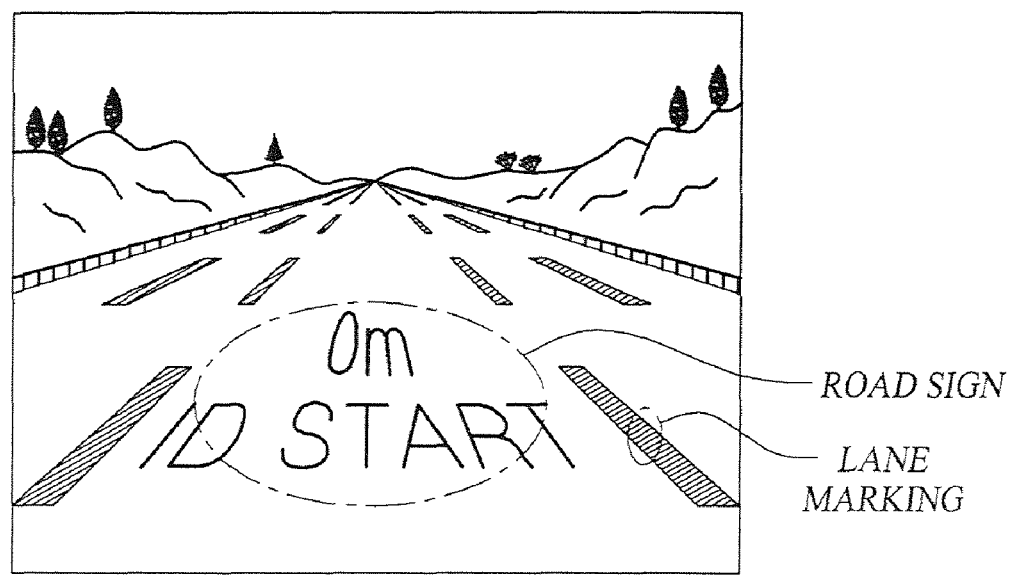

Referring to FIG. 3A, the lane detecting apparatus 100 according to the embodiment of the present invention detects a lane 300 by extracting lane markings 310. However, since a road sign 320 (for example, a right turn sign) is extracted simultaneously in the process of extracting the lane markings 310, an error may be caused in extracting the lane markings 310. Since the road sign 320 is displayed on a road together with the lane markings 310 and includes the same color information as that of the lane markings 310, the road sign 320 (for example, a right turn sign) is displayed extracted together in extracting the lane markings 310. FIG. 3B illustrates an actual image input by a camera, and the road sign (an ID start sign) and the lane markings as in FIG. 3A can be verified together.

Figure 4:
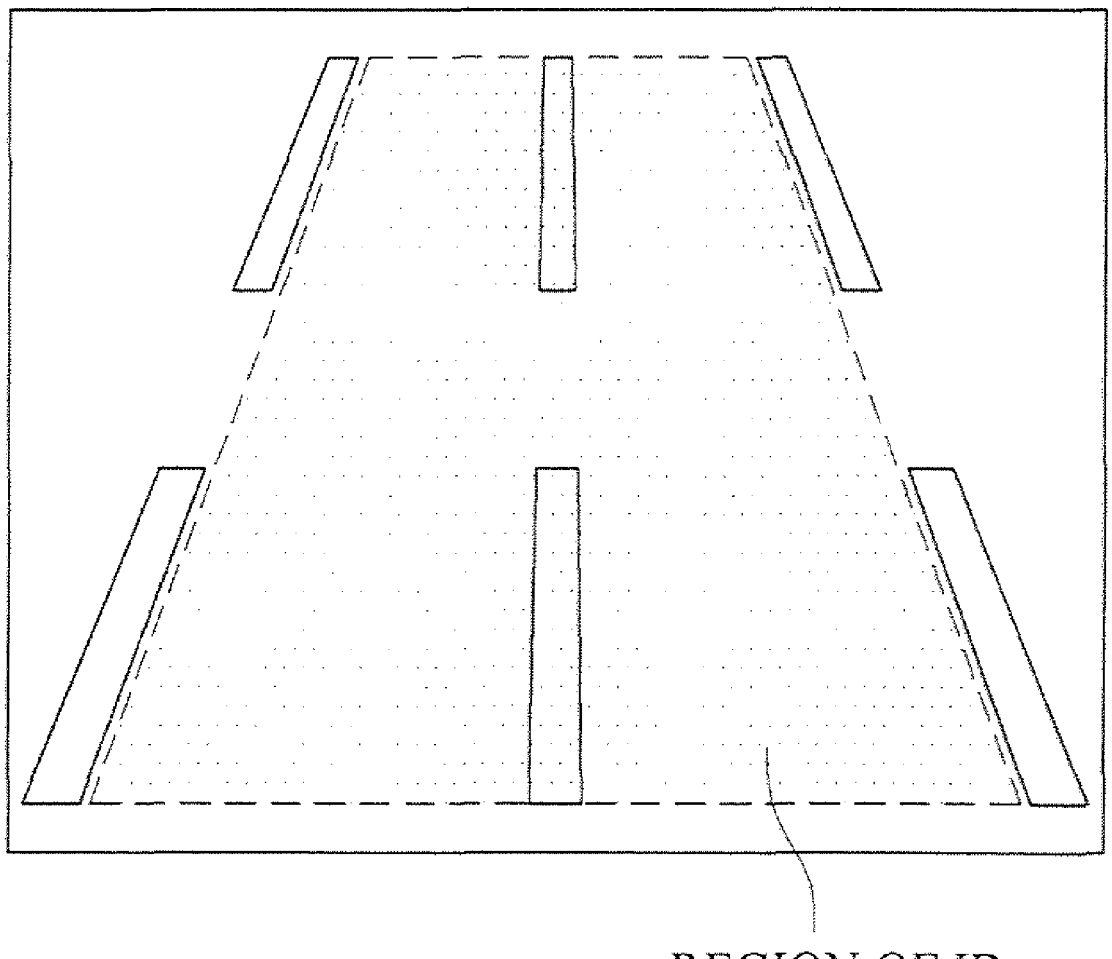
FIG. 4 is a view illustrating an example of a region of ID set to search for a road sign that will be removed in the lane detecting method according to the embodiment of the present invention.

In order to remove the above-described road sign, the region of ID setup 110 of the lane detecting apparatus 100 according to the embodiment of the present invention sets a region of ID that may include an entire road region of the current lane (driver's lane) in order to search for a road sign within the road region of the current lane (driver's lane). An example of the region of ID is illustrated in FIG. 4. In order to set a region of ID that includes an entire road region of the current lane (driver's lane), the region of the driver's lane is always included in an image when the lane exists over a middle point of the image and the image includes the regions of both the lanes.

The image acquired by a camera may be a binarized image, in which case the road sign verifier can verify existence of a road sign based on the coordinate value of the binarized image. An example of an algorithm for verifying existence of a road sign based on a binary image will be described in the following formula.

$$U = \begin{cases} 1 & \text{if } S(B(x, y)) > C_1 \\ 0 & \text{else} \end{cases} \quad \text{Formula 1}$$

Here, $$S(B(x, y)) = \begin{cases} 1 & \text{if } \overset{h_2}{\underset{y=h_1}{Q}} L(B(x, y)) > C_2 \\ 0 & \text{else} \end{cases}$$

$$L(B(x, y)) = \overset{w_2}{\underset{x=w_1}{Q}} |B(x, y) - B(x+1, y)|$$

In Formula 1, if U is 1, there exists a road sign. On the contrary, if U is 0, there exists no road sign. (x,y) is coordinate value of a binarized image and B(x,y) refers to the binarized image. $C_1$ and $C_2$ are arbitrary constants that are standards for determining existence of a road sign and may be set to be larger or smaller according to a precision in determination of existence of the road sign.

The above-described ROI is a range for detecting a lane and needs to be set to be minimized to reflect the shape of the lane. That is, it is preferable that the ROI includes only the lane if possible and excludes an object or a sign (for example, a road sign) that hampers detection of the lane.

The above-described ROI setup 130 sets an ROI using lane tracking. In an ROI setting method using lane tracking, a lane prediction result is obtained using a prediction filter for predicting lane information, and an ROI is set by calculating a difference value between the obtained lane prediction result and the previous lane information. The road sign that has existed within the region of ID is removed from the set ROI. Here, the previous lane information refers to the lane information obtained when the lane markings before the currently extracted lane markings are extracted, i.e. the lane information of the previous frame.

When an ROI is set using the above-described lane tracking, a Kalman filter is preferably used as a prediction filter, but the present invention is not limited thereto.

The above-described lane prediction result and previous lane information may include information regarding an angle with respect to a lane and an offset value.

That is, in the ROI setting method using the lane tracking used in the embodiment of the present invention, a Kalman prediction result value by a Kalman filter is calculated from the lane information of the previous frame such as an angle or an offset value. The difference value between the Kalman prediction result value and the lane information (an angle, an offset value, etc.) of the previous frame and a region (for example, a specific region near the difference value) based on the difference value is set to an ROI.

Figure 5A:
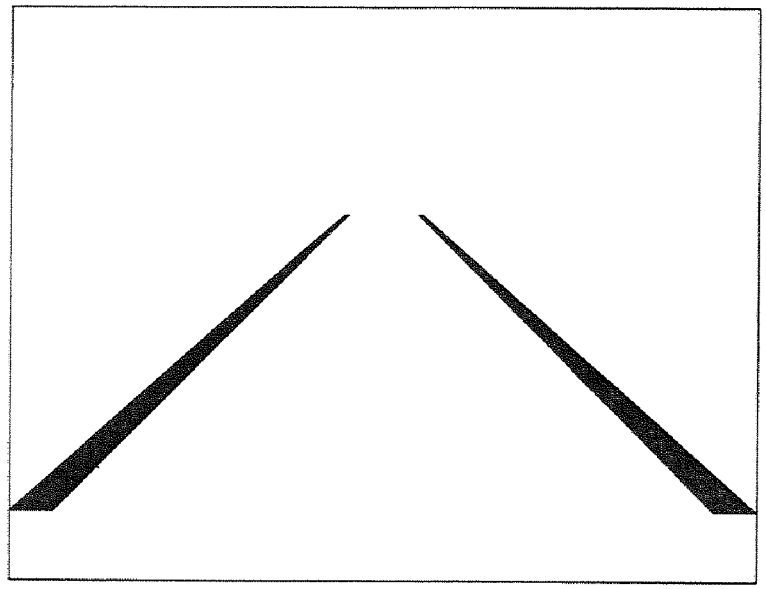
FIGS. 5A and 5B are views illustrating an example of an ROI set by removing a road sign that will be removed in the lane detecting method according to the embodiment of the present invention.
Figure 5B:
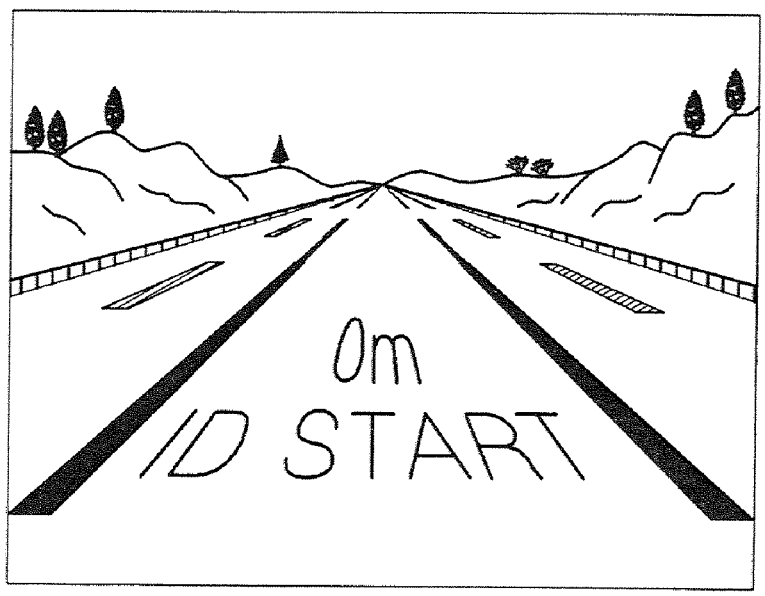

FIGS. 5A and 5B illustrate an example of an ROI set by removing a road sign that is a target to be removed in the ROI setup 130 of the lane detecting apparatus 100 according to the embodiment of the present invention. Referring to FIG. 5A, the white-colored region is an ROI that is set using lane tracking information. It can be seen that the ROI is considerably limitedly set as compared with the ROI set by an existing lane detecting apparatus, and a road sign can be removed by the limited setting. FIG. 5B is a view illustrating an ROI set in an actual image. It can be seen that the ROI of FIGS. 5A and 5B are set to be very similar to lane markings.

The lane detector 140 detects a lane by extracting lane markings using lane tracking based on an ROI set by removing a road sign. An example of lane markings extracted by removing a road sign is illustrated in FIG. 6B. Meanwhile, FIG. 6A is a view illustrating generation of an error in lane markings extracted without removing a road sign according to the existing detection of a lane.

Figure 6A:
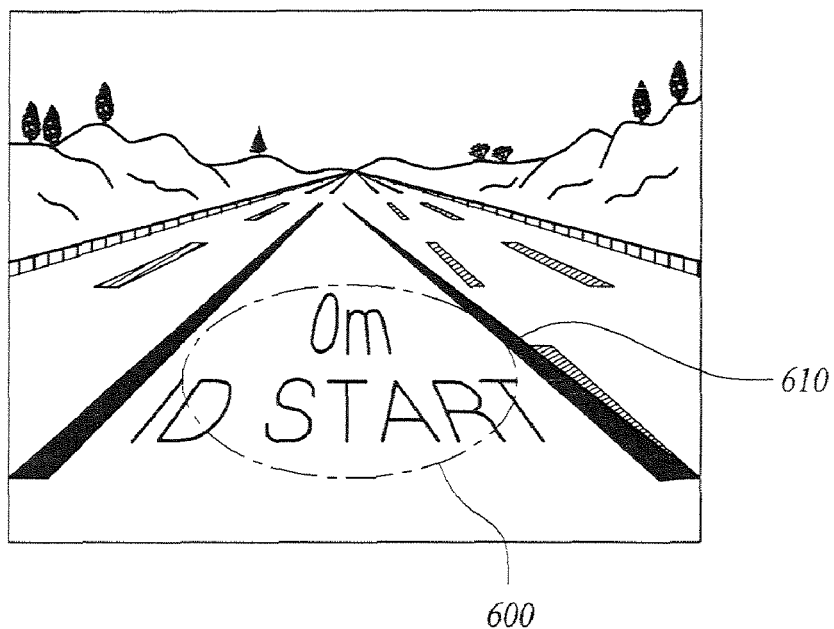
FIGS. 6A and 6B are views illustrating an example of a lane detected by the lane detecting method according to the embodiment of the present invention.
Figure 6B:
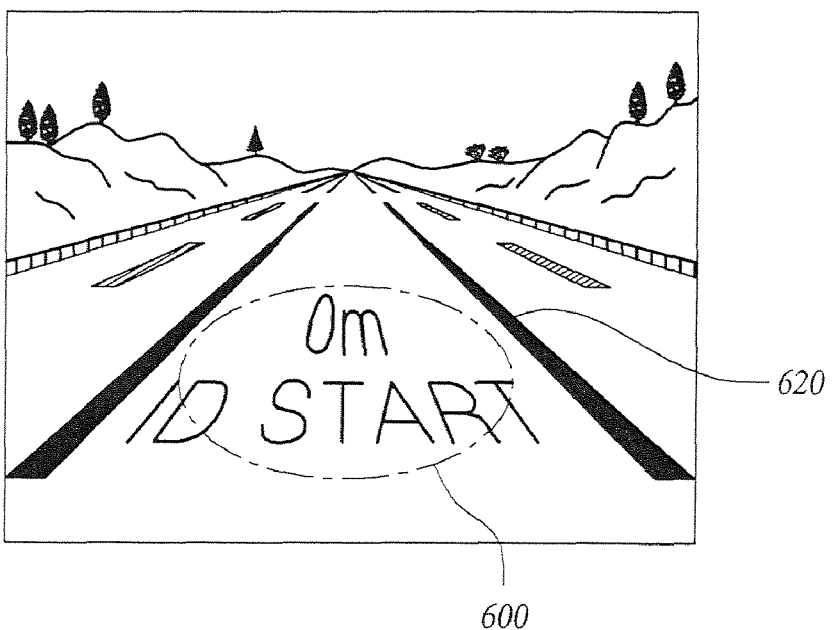

Referring to FIG. 6A illustrating the existing detection of a lane, since a road sign 600 is not removed, lane markings 610 different from actual ones are extracted.

On the contrary, referring to FIG. 6B in which the detection of a lane according to the embodiment of the present invention is illustrated, in spite of existence of the same road sign 600, the same lane markings 620 as the actual ones can be extracted by removing the road sign 600.

The lane detecting apparatus 100 according to the embodiment of the present invention that has been described with reference to FIG. 1 can perform an edge distribution function (EDF), steerable filtering, Hough transform; inner pixel detection, inner pixel fitting, etc.

FIG. 2 is a schematic flowchart illustrating a lane detecting method according to an embodiment of the present invention.

As illustrated in FIG. 2, the lane detecting method according to the embodiment of the present invention includes the steps of: setting a region of ID for verifying existence of a road sign that will be removed to detect a lane (S200); verifying existence of a road sign within the set region of ID (S202); setting an ROI from which the existing road sign is removed (S204); and detecting a lane based on the set ROI (S206).

In the step of setting a region of ID (S200), a region of ID including a road region of the current lane is set in an image acquired by a camera. In the step of verifying a road sign (S202), existence of a road sign is verified within the set region of ID. In the step of setting an ROI (S204), if there exists a road sign, a difference value between a lane prediction result and the previous lane information is calculated and an ROI is set based on the calculated difference value. In the step of detecting a lane (S206), a lane is detected by extracting lane markings within the set ROI.

The ROI set in the step of setting an ROI (S204) refers an ROI from which the road sign that has existed in the region of ID is removed by calculating the difference value between the lane prediction result and the previous lane information to set the ROI.

Figure 7:
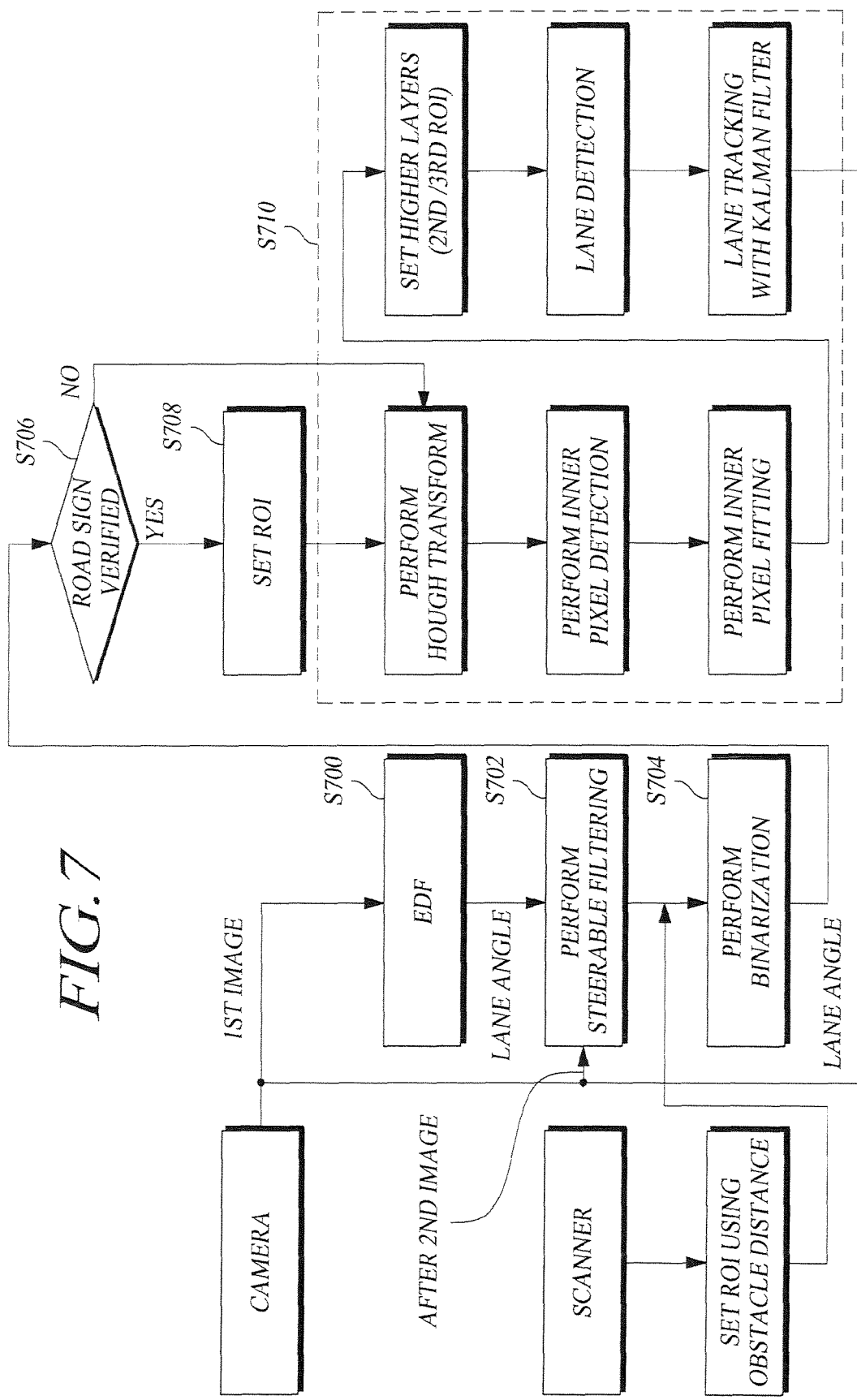
FIG. 7 is a flowchart of a lane detecting method according to another embodiment of the present invention.

FIG. 7 is a flowchart illustrating a lane detecting method according to another embodiment of the present invention. That is, FIG. 7 illustrates a lane detecting method according another embodiment of the present invention.

Referring to FIG. 7, the lane detecting method according to the other embodiment of the present invention may include the steps of: performing an edge distribution function (EDF) (S710); performing steering filtering (S702); and binarizing an image (S704), in addition to the steps of setting a region of ID and verifying existence of a road sign within the region of ID (S706); setting an ROI (S708); and detecting a lane (S710).

The above-described step of detecting a lane (S701) may include the steps of performing Hough transform, performing inner pixel detection, and performing inner pixel fitting.

Although all the elements constituting the embodiments of the present invention are combined into one or combined with each other to be operated, the present invention is not limited to those embodiments. That is, within the scope of the present invention, at least one of the elements may be selectively combined with each other to be operated. The elements may be realized by independent hardware respectively, but also may be realized by a computer program having a program module performing some or all of one or combined hardware by combining some or all of the elements selectively. The codes and code segments constituting the computer program could be easily reasoned out by those skilled in the art. The computer program may be stored in a computer readable media and be read and executed by a computer to realize the embodiments. The storage media of the computer program may include a magnetic recording medium, an optical recording medium, and a carrier wave medium.

Also, the phraseology and terminology used herein is for the purpose of description and should not be regarded as limiting. The use of "including", "comprising", or "having", and variations thereof herein, is meant to encompass the items listed thereafter and equivalents thereof as well as additional items. Unless otherwise specifically defined herein, all terms including technical or scientific terms are to be given meanings understood by those skilled in the art. Like terms defined in dictionaries, generally used terms needs to be construed as meanings used in technical contexts and are not construed as ideal or excessively formal meanings unless otherwise clearly defined herein.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. Therefore, the embodiments of the invention is given not to limit but to explain the technical spirit of the invention, and the scope of the invention is not limited by the embodiments. The scope of the invention should be construed by the claims, and the equivalents to the invention is construed as included in the scope of the invention.

What is claimed is:

1. A lane detecting apparatus comprising:
    a region of ID setup setting a region of ID including a road region of a current lane in an acquired image;
    a road sign verifier verifying existence of a road sign within the set region of ID;
    an ROI setup calculating a difference value between a lane prediction result and previous lane information when the road sign verifier verifies existence of the road sign and setting an ROI based on the calculated difference value, wherein the set ROI is an ROI from which the road sign that hampers detection of the lane and has existed within the region of ID is removed by calculating the difference value between the lane prediction result and the previous lane information to set the ROI thereby; and
    a lane detector detecting a lane by extracting lane markings based on the set ROI.

2. The lane detecting apparatus as claimed in claim 1, wherein the ROI setup removes the road sign from the ROI by obtaining the lane prediction result using a prediction filter for predicting lane information and calculating the difference value between the obtained lane prediction result and the previous lane information to set the ROI thereby.

3. The lane detecting apparatus as claimed in claim 1, wherein the lane prediction result and the previous lane information include information regarding an angle with respect to the lane and an offset value.

4. The lane detecting apparatus as claimed in claim 1, wherein the previous lane information is lane information obtained when lane markings are extracted before extraction of the current lane markings.

5. The lane detecting apparatus as claimed in claim 1, wherein when the acquired image is a binarized image, the road sign verifier verifies existence of the road sign based on the coordinate value of the binarized image.

6. A lane detecting method comprising the steps of:
    (a) setting a region of ID including a road region of a current lane in an acquired image;
    (b) verifying existence of a road sign within the set region of ID;

(c) calculating a difference value between a lane prediction result and previous lane information when existence of the road sign is verified in step (b) and setting an ROI based on the calculated difference value, wherein the set ROI is an ROI from which the road sign that hampers detection of the lane and has existed within the region of ID is removed by calculating the difference value between the lane prediction result and the previous lane information to set the ROI thereby; and (d) detecting a lane by extracting lane markings based on the set ROI.

\* \* \* \* \*